(12) United States Patent
Fedorak et al.

(10) Patent No.: US 7,109,975 B2
(45) Date of Patent: Sep. 19, 2006

(54) COMPUTER POINTER CONTROL

(75) Inventors: Mark V. Fedorak, Edmonton (CA);
John-Michael B. Carolan, Edmonton (CA); Milton E. Milley, Edmonton (CA); Edmond Lou, Edmonton (CA)

(73) Assignee: Meta4Hand Inc., Edmonton (CA)

( * ) Notice: Subject to any disclaimer, the term of this patent is extended or adjusted under 35 U.S.C. 154(b) by 281 days.

(21) Appl. No.: 10/248,566

(22) Filed: Jan. 29, 2003

(65) Prior Publication Data
US 2003/0222856 A1 Dec. 4, 2003

Related U.S. Application Data

(60) Provisional application No. 60/352,228, filed on Jan. 29, 2002.

(51) Int. Cl.
*G09G 5/08* (2006.01)
(52) U.S. Cl. ............................ 345/173; 715/862
(58) Field of Classification Search ................ 345/163, 345/173; 715/857, 862
See application file for complete search history.

(56) References Cited

U.S. PATENT DOCUMENTS

| 5,327,161 A | 7/1994 | Logan et al. |
| 5,398,044 A | 3/1995 | Hill |
| 5,543,590 A | 8/1996 | Gillespie et al. |
| 5,883,617 A | 3/1999 | Yoshikawa |
| 6,057,830 A | 5/2000 | Chan et al. |
| 6,160,538 A * | 12/2000 | Lambrechts ................ 345/163 |
| 6,292,173 B1 | 9/2001 | Rambaldi et al. ........... 345/157 |
| 6,333,735 B1 | 12/2001 | Anvekar ..................... 345/175 |
| 6,590,567 B1 * | 7/2003 | Nagao et al. ............... 345/173 |
| 2002/0047830 A1 | 4/2002 | Philipson |

FOREIGN PATENT DOCUMENTS

DE 3523284 1/1987

OTHER PUBLICATIONS

'Pointing Device' IBM Technical Disclosure Bulleting, IBM Corp. New York, USA, vol. 37, No. 6A, Jun. 1, 1994 pp. 137 XP000455716.

* cited by examiner

*Primary Examiner*—Kent Chang
(74) *Attorney, Agent, or Firm*—Johnny J. Haugen; William J. Bundren

(57) ABSTRACT

The present invention relates to a method and system which allows for the transfer of pointer movements and events from small devices with space and data rate constraints to a display device. This will allow a pointer device to be implemented in a small area, but will still enable full pointer movement and event capabilities.

32 Claims, 11 Drawing Sheets

COMPUTER POINTER CONTROL

BACKGROUND OF INVENTION

The present invention relates to a method and system for controlling the movement of a computer pointer.

The development of low-power, compact, mobile remote control devices has fostered a need for the development of methods of sending pointer and control information to a display device.

The original pointer controller, now referred to as a "mouse", was developed in 1964 and has since become one of the primary input devices for a multitude of different computer systems and the dominant input device for personal desktop computing. The mouse, in its current form, works well for situations where there is sufficient room for the movement of the mouse device (approximately one square foot). However, it does not work well for situations where there is very little room for hand movements, such as on a laptop or handheld computer. The prior art describes a variety of different pointer controllers, some of which have been realized into commercial products and many of which have not. Two notable controllers are designed for compact situations and have been embodied in commercial products. One is a joystick-like device, which is located on the keyboard and works in response to lateral directional pressure placed on it by a user. Click information is provided by a separate button. The other is a touch pad, which works by tracking the pressure, direction and velocity of touch movements (finger or stylus) and relaying this information to the computer. The pointer movement mimicks the movement of the finger or stylus.

However, all of these devices have the disadvantage of requiring special hardware and requiring a constant transmission of data. This is fine for systems having a direct connection to their computing devices; however, they are not well suited to low-power, portable wireless systems which do not have the substantial resources required.

Therefore, there is a need in the art for methods and systems which permit the sending of pointer data from a low-power, compact pointer controller to a display device.

SUMMARY OF INVENTION

The present invention is based on the principle that pointer commands and movement do not necessarily have to involve the constant relay of information from the pointer device itself. Therefore it is possible to indicate a direction, magnitude of movement, and a stop indicator which can be controlled by the operator while viewing the pointer movement on the screen. This is very useful for sending pointer movement commands in a space-limited application such as a touch screen similar to that found on a personal data assistant (PDA) or cell phone.

Therefore, in one embodiment, the invention comprises a method whereby when the user first touches the control surface, using a finger or stylus, the x and y coordinates of that point are stored into the memory of the system and a timer is started. The point of initial contact becomes the centre coordinate (0,0). Thus, it does not matter where the user initially applies pressure.

If the user removes pressure before the timer expires, then a "click" event is generated; otherwise, continued pressure will indicate that the operator wants to initiate or continue a pointer movement. For the purpose described herein, a click event is defined as either the simulation, or the physical act, of pressing down and releasing a button and is intended to be the equivalent of a "mouse click". If pressure is maintained on the surface of the pad, and the user moves the pressure point away from the centre point, the angle and distance of the pressure point from that centre point is continuously calculated by the controller device.

In one embodiment, the system sets up a polar grid projecting away from the centre point in all directions. The grid is defined by directional lines which radiate outwardly from the centre point to divide the grid into directional zones. Substantially circular lines intersect the directional lines to create annular velocity zones. The polar grid therefore is analogous to a dart board with the centre point being equivalent to the "bulls eye". An individual sector therefore corresponds to a direction and a velocity. Only when the user moves from one sector of the grid to another will the system actually transfer the data to the other system. If pressure is maintained within one sector, then the last transmitted angle and velocity are maintained.

Essentially, the user starts the pointer off in an initial direction with an initial velocity and thereafter moves it into other directions and/or velocities, by scales of magnitude associated with each sector of the grid, until the pointer gets to where the user wants it. At this point, the user will release the pressure on the pad and a stop command is transmitted to terminate movement of the pointer.

Fine pointer control may be provided by increasing the number of sectors by increasing either or both of the number of directional zones or the number of velocity zones. If pressure is maintained, and the user moves further away from the centre point, the screen pointer direction movements will get coarser as velocity increases relative to the distance from the centre point. The screen pointer can therefore move a greater distance more quickly with only a relatively small movement along the pressure grid of the controller.

As the user applies pressure back towards the centre point, the screen pointer"s velocity will slow and accuracy will be restored. For example, if the user wants to quickly move the screen pointer across the screen, the user will venture further away from the centre point in the direction they want to go and a fast, but coarse, screen pointer movement will result. If the user wishes to home the screen pointer in on a specific point on the display, they will stay very close to, or return to, the centre point and slow but accurate movements will result.

It is preferred, but not necessary, that the directional lines be equally spaced apart, thereby creating directional zones of equal size. However, it may be preferred, but not necessary, that the velocity zones be unequally spaced. In one embodiment, the slower velocity zones nearer the centre point are tightly bunched while the faster zones are larger. As well, the relationship between the velocity assigned to a point and distance to the centre point need not be linear.

To stop movement of the pointer, the user disengages touching the pad resulting in a stop command being sent to the display device. Therefore, if the user stops movement on the pad, but maintains pressure on the pad, the screen pointer on the display device will still continue to move in the last direction transmitted and with the velocity specified by that transmission. Only when the user stops touching the pad does the screen pointer on the display stop moving.

The pad movement calculation is triggered whenever the user has moved a far enough distance along the pad that a discernable unit (sector) difference is now identified by the controller. This could be a movement from one pixel (or twip) to another or could be a voltage level change from a pressure sensor. The movement calculation involves the use of trigonometric functions to determine a distance and angle away from the centre point. This distance and angle may then be normalized and a sector. coordinate given that represents a fixed velocity and direction.

Most pointers include not only the ability to move the screen pointer but also the ability to click on and move objects. These events require one or more buttons. These buttons can be actual buttons or an area of the pad designated to act like buttons in order to provide for the transmission of button events such as button click, button down and button up. On a touch screen, the buttons may be represented as graphics on the screen and the pad may be any section of the screen in which the method described here is implemented.

Therefore, in one aspect, the invention may comprise a method of providing user input to a computer, including control of pointer and click events, comprising the steps of:

(a) defining a contact-sensitive sensor area;
(b) establishing an initial x-y coordinate for an initial contact point wherein such contact may then be moved while remaining in contact with the sensor area to a second x-y coordinate;
(c) calculating the distance r and the angle θ between the first and second x-y coordinates;
(d) correlating the angle θ to a direction of pointer movement and correlating distance r to a velocity of pointer movement;
(e) creating a signal to move or click the pointer, said signal including velocity, direction, and click information.

In another aspect, the invention may comprise a method of controlling a pointer on a display screen of a computing device, including click events, comprising the steps of:

(a) sending a signal combining event type data, directional data and velocity data to control the pointer;
(b) causing the pointer to move in accordance with the signal until a new signal is sent, wherein a new signal is sent only upon a change in one or more of event type data, directional data or velocity data comprising the signal.

In another aspect, the invention may comprise a system for controlling a pointer in a computer system, comprising:

(a) a contact-sensitive sensor area associated with a Cartesian coordinate grid;
(b) means for calculating the distance r and the angle θ between any two points in the grid;
(c) means for correlating the angle θ to a direction of pointer movement and distance r to a velocity of pointer movement;
(d) means for creating a signal to move or click the pointer, said signal including velocity, direction, and click information.

In another aspect, the invention may comprise a system for controlling a pointer on a display screen of a computing device, including click events, comprising:

(a) means for sending a signal combining event type data, directional data and velocity data to control the pointer;
(b) means for causing the pointer to move in accordance with the signal until a new signal is sent, wherein said new signal is sent only upon a change in one or more of event type data, directional data or velocity data comprising the signal.

BRIEF DESCRIPTION OF DRAWINGS

Embodiments of the invention will now be described with reference to the accompanying drawings in which.

DETAILED DESCRIPTION

Figure 1:
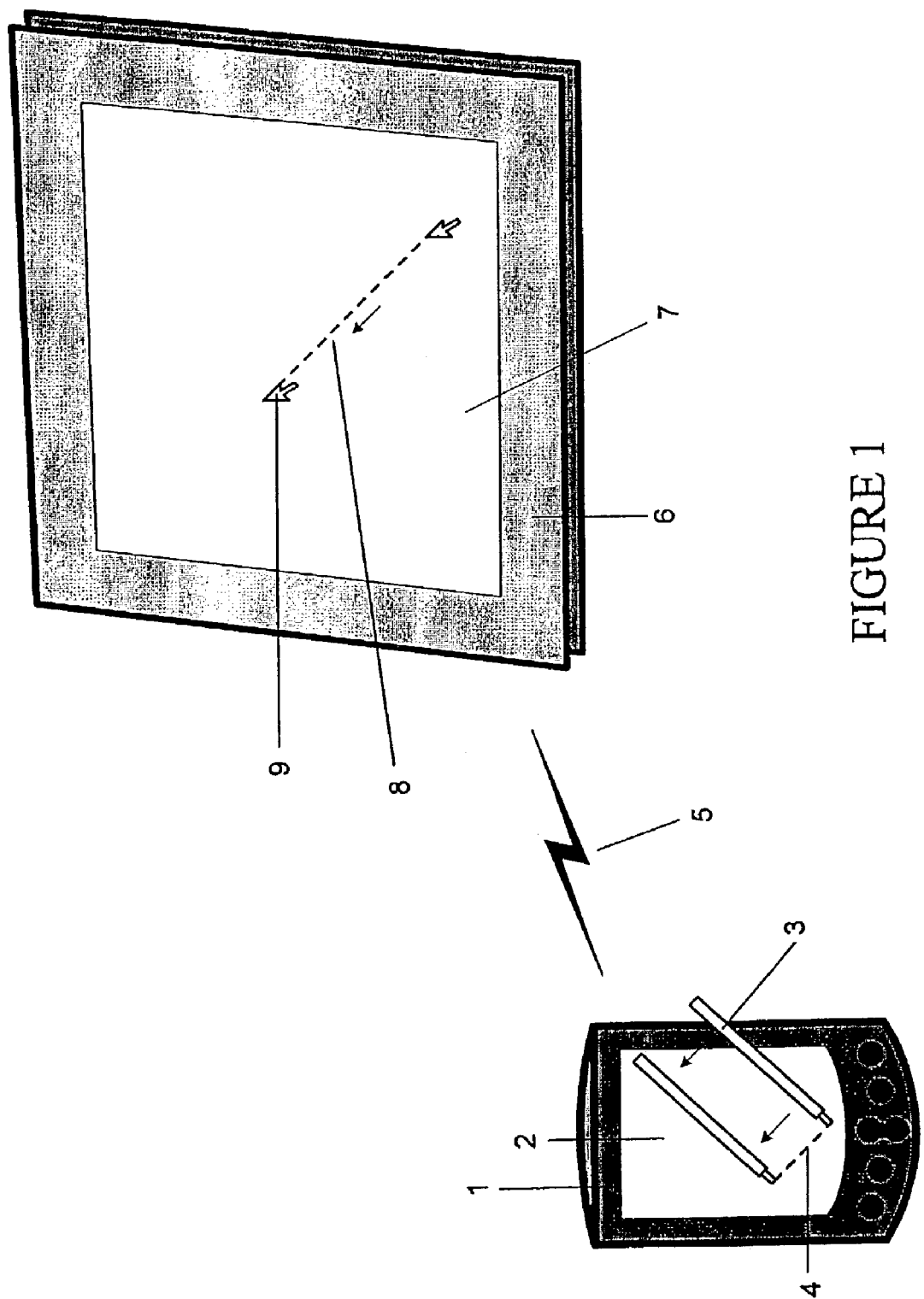
FIG. 1 is a schematic diagram of one embodiment of the invention.

A computing system which includes the pointer control system of the present invention will include a display device (6) which typically comprises a display screen (7). This display (7) could be an LCD, CRT, projection, or any other device that provides visual feedback and is exemplified by a CRT computer monitor. The other device that is required is a pointer device (1) which may be a handheld computer, cell phone or a personal digital assistant (PDA). This device must have a contact-sensitive sensor area that allows input of pointer commands (2) and could be a touch pad, joystick, or as shown in FIG. 1, a touch screen (2). As used herein, a "contact-sensitive sensor area" means any pre-defined or user defined area where contact and/or movement may be sensed by any means. One embodiment described herein will refer to a pointer area referred to hereafter as a "pad" or "touch pad" having a rectangular shape and area.

The methods of the present invention may be implemented in the pointer device as software embodied as an application running inside an operating system, an embedded application, or as firmware encoded on a processor. Hardware, which could be any logic device, synchronous or asynchronous, that is capable of running the software, may be referred to herein as a system. In one embodiment, an integrated circuit could be designed to incorporate all of the hardware and software into a single chip.

An implement (3) must also be used to apply pressure to the pad to indicate movement. This could be a finger, or as shown in FIG. 1, a touch screen stylus as is commonly seen on PDAs. As well, there must be some type of communications interface (5) between the two devices which could be a wired or wireless connection using any protocol whatsoever. The output from the pointer device (1) is processed by signal processing circuits or software which provides outputs for the pointer control circuit or software associated with the display (7).

When the user presses on the pad (2) with the implement (3), and moves the implement (3) in a direction away from the point of first contact (4), the pointer (9) on the display device (6) will move accordingly in the same direction (8) as the movement on the pointer device (1). The velocity of this movement (4) is controlled by the distance between the last position of the implement and the point of first contact. The velocity will change as the implement is moved further away or closer to the point of first contact. If the user stops moving the implement (3), but still has contact with the pad (2), the pointer (9) will continue moving in the same direction (8), but will maintain a constant velocity. If the user lifts the implement (3) from the pad (2), the pointer (9) will stop moving.

To accomplish the above movement, when the user first touches the pad (2), the Cartesian coordinates of that point of first contact are stored as X (20) and Y (21) and (X,Y) defines the centre point (22). Some systems with very small pad surfaces (2) may require the use of constant X (20) and Y (21) values and, therefore, a constant centre point (22). Coincidental with the storage of (X,Y), a timer is also initiated on first contact. If the implement (3) is removed from the pad (2) prior to the timer expiring, a button click event will be sent and no pointer (9) movement will be initiated. This latter event is equivalent to the left-mouse button click on a standard computer mouse. The timer may be set or adjusted by the user for an appropriate length of time.

Figure 2:
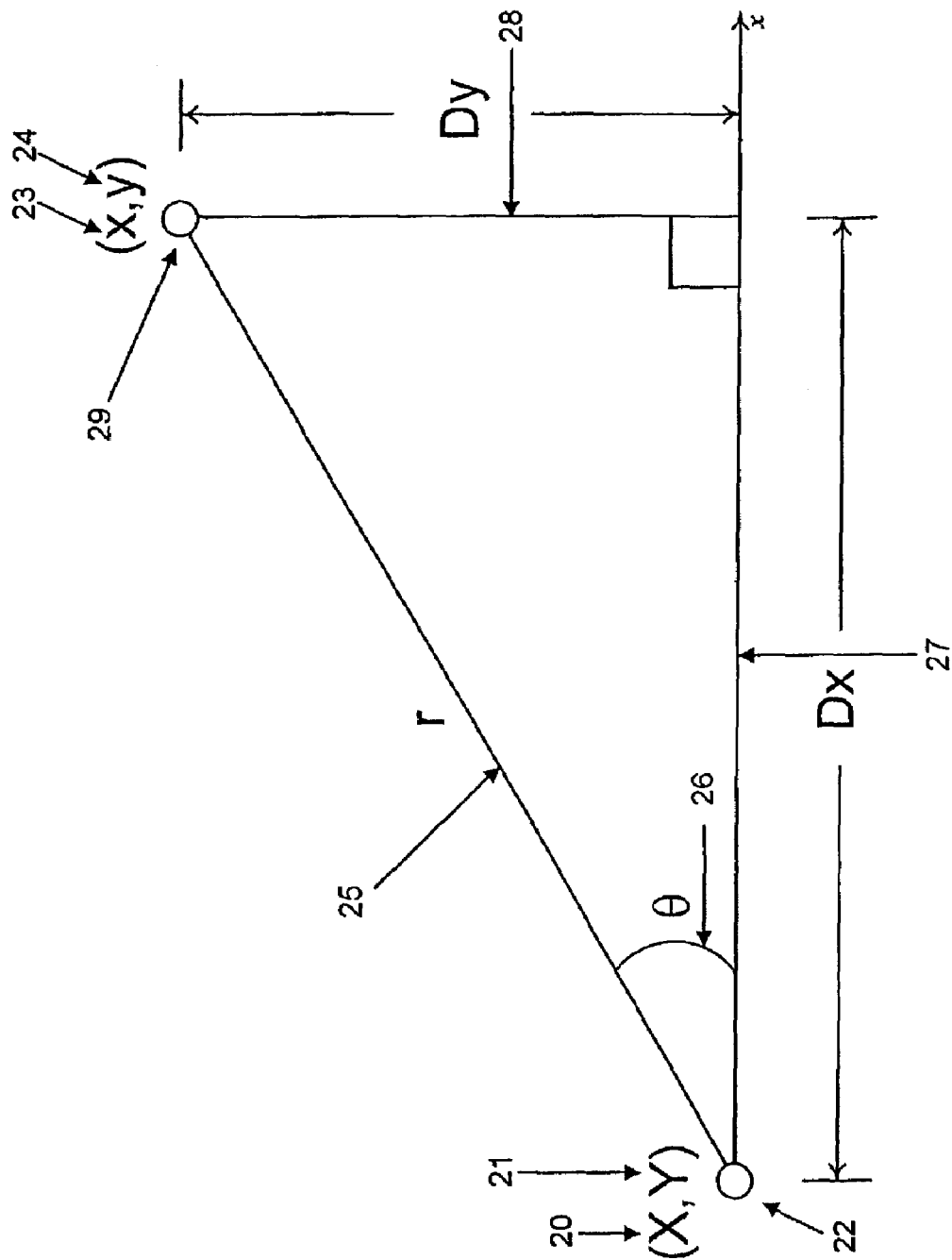
FIG. 2 is a schematic diagram illustrating the calculation of angle and magnitude of movement.

The pad (2) is divided into a Cartesian grid of which there may be a plurality of different points all of which can be represented by x and y values. These points may correspond to individual pixels on an LCD touch screen. FIG. 2 shows the trigonometry of the centre point (22) and a new point x,y (29). As the user moves away from the centre point (22), the current x (23) and y (24) values of the new point (29) are used to calculate the angle $\Theta$ (26) and distance r (25) away from the centre point (22). Angle $\Theta$ (26) determines the direction of pointer movement and distance r (25) determines the speed of pointer movement.

Angle $\Theta$ (26) is determined by the magnitude of rise Dy (28) and the run Dx (27) from the centre point (22), as shown in Equation 1.

$$Dx = x - X$$
$$Dy = y - Y \quad (1)$$

In order to ensure the successful calculation of the angle $\Theta$ (26), a test is made to ensure that Dx (27) is non-zero as the Arc Tangent function will fail if the Dx (27) value is zero. If the value of Dx (27) is zero, then the value of the angle (26) will be 90° if the value of Dy (28) is positive, and will be 270° if the value of Dy (28) is negative. For all other values where Dx (27) is non-zero, Equation 2 will give the value of the angle $\beta$ (in degrees) from the nearest reference axis.

$$\beta = \arctan\left(\frac{Dy}{Dx}\right) \times \frac{180}{\pi}$$

The angle $\beta$ will be the same as angle $\theta$ (26) when both the Dx (27) and Dy (28) values are positive; however, when both values are not positive the angle $\theta$ (26) can be derived from angle $\beta$ using basic trigonometric principles. Therefore, the logic tree in Equation 3 will provide the correct angle $\theta$ (26) referenced to the positive x-axis.

```
if Dx > 0 then                              (3)
    if Dy > 0 then
        θ = β
    else
        θ = 360 + β
    end if
else
    θ = 180 + β
end if
```

Equation 3 essentially checks to see which quadrant the point is in and then uses the known sign to calculate the angle $\theta$ (26). If both Dx (27) and Dy (28) are positive, then the point (29) is in quadrant I and the angle $\theta$ (26) is equal to angle $\beta$. If Dx (27) is positive and Dy is negative, then we know that the point (29) is in the IV quadrant and that the angle $\beta$ is negative. Therefore, if we add 360° we will obtain the angle $\theta$ (26). For the case where the point (29) is in quadrants II or III, the angle $\theta$ (26) will be calculated by adding the value of $\beta$ to 180°. The arc tangent function will produce a negative angle whenever the signs of Dx (27) and Dy (28) differ, or, stated another way, whenever the point is in quadrants II or IV. Therefore, if the point is in quadrant II, the angle $\beta$ will be negative. Therefore, adding 180° will produce the angle $\theta$ (26) somewhere in between 90° and 180°. If the point is in quadrant III, the angle $\beta$ will be positive. Therefore, adding 180° will produce the angle $\theta$ (26) somewhere between 180° and 270°.

After the angle $\theta$ (26) has been calculated, the distance r (25) from the centre point (22) to the current point (29) must be calculated. This distance r (25) is easily calculated using Pythagoras's theorem and the calculation is shown in Equation 4.

$$r = \sqrt{Dx^2 + Dy^2} \quad (4)$$

Figure 3A:
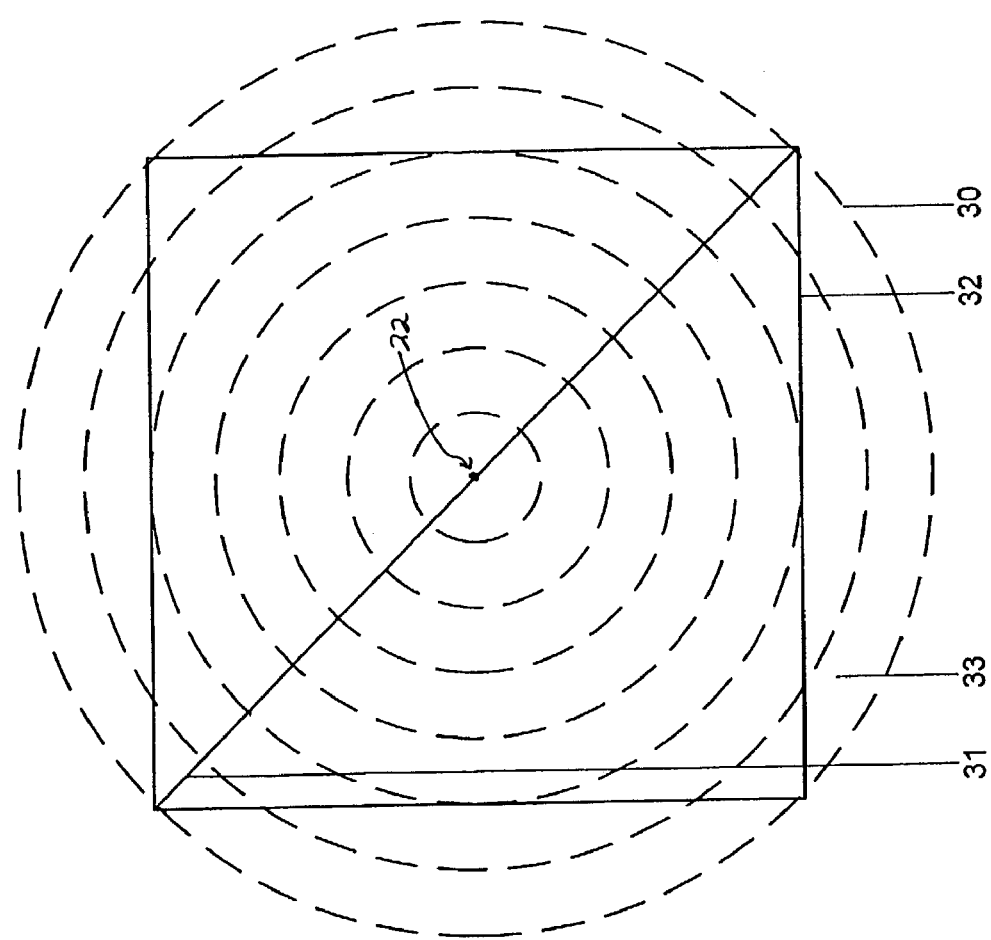
FIGS. 3A, 3B, 3C, 3D and 3E are schematic diagrams illustrating different examples of how velocity zones are derived and also illustrating the concept of velocity factors.

Distance r may be correlated to velocity of the pointer by a pre-determined formula or by a look-up table. In its simplest form, velocity may equal r multiplied by a constant, which creates a linear relationship between r and velocity. In one embodiment, shown in FIG. 3A, distance r is normalized by creating annular velocity zones (33) with concentric circles having the common centre point. The acceleration between velocity zones (33), and across an acceleration point, (30) is defined as instantaneous and can be described by a unit step function. The length of velocity zones (33), or the space between acceleration points (30), is called the velocity factor $\Phi$. In one embodiment, the factor is calculated by taking the length of the screen (32) from corner to corner (31) and dividing it by twice the number of acceleration points (30). This number is then used to normalize the distance r. For linearly spaced acceleration points (30) as shown in FIG. 3A, the following formula can be used:

$$\text{Velocity Zone} = \frac{\text{Distance}}{\text{Velocity Factor}} = \frac{r}{\Phi} \quad (5)$$

Figure 3B:
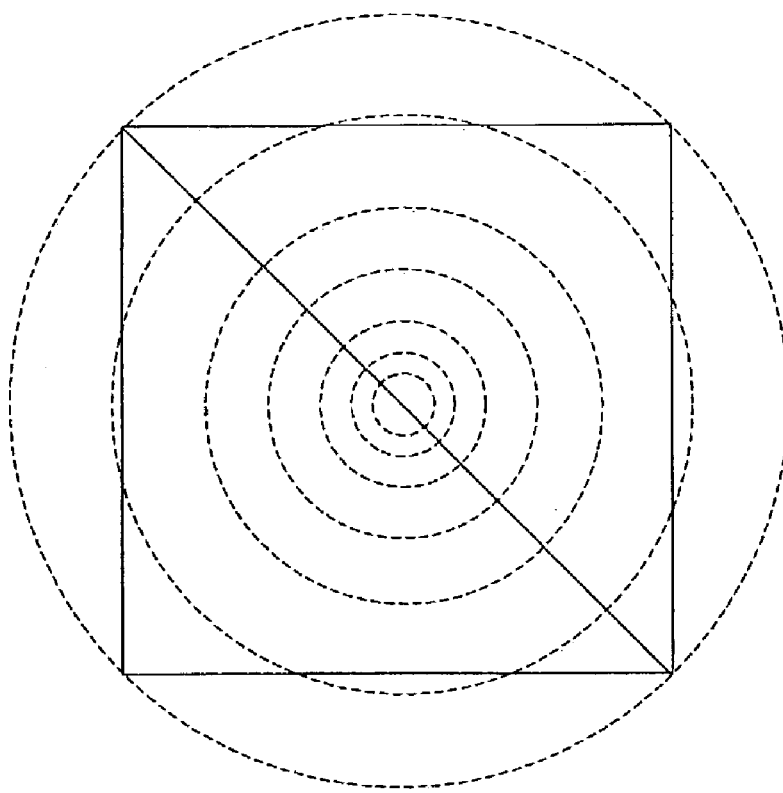
Figure 3C:
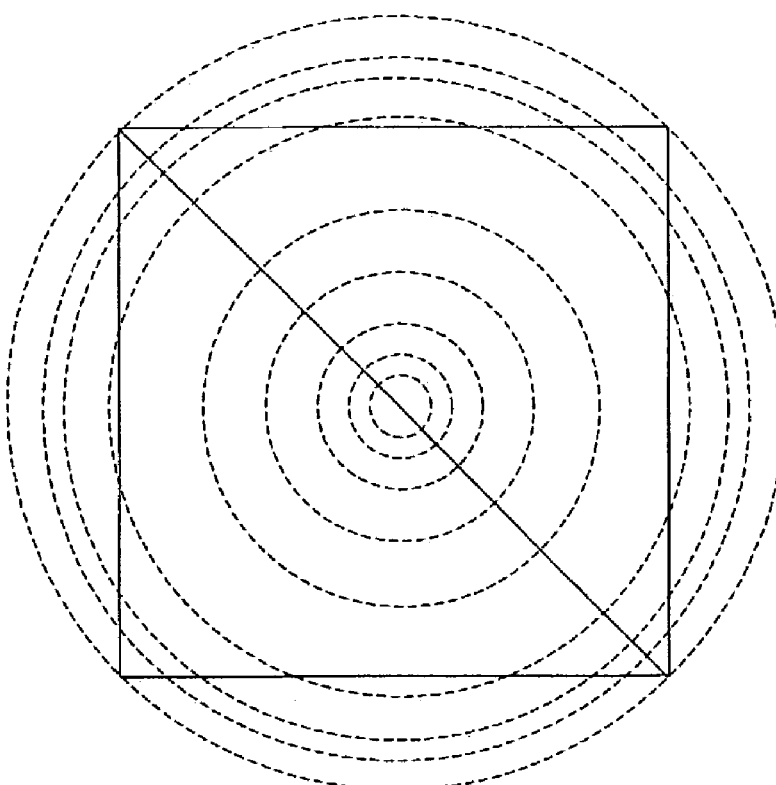

Alternatively, the velocity factor $\Phi$ may be variable resulting in non-uniformly spaced acceleration points (30) as shown in FIGS. 3B and 3C. In FIG. 3B, the acceleration points are spaced farther apart as the distance r from the centre point increases and velocity increases. In FIG. 3C, the acceleration points are spaced further apart as distance r increases to a point where the spacing becomes smaller as distance r increases.

In another alternative embodiment, velocity may increase as distance r increases to a maximum value at which point velocity decreases as distance r increases.

Alternatively, non-linear velocity gradients may be provided using uniformly spaced acceleration points combined with velocity set points which increase non-linearly. Therefore, in one embodiment, finer speed control is possible by making a gradient of velocity zones (33) such that there is a smoother transition between zero velocity and maximum velocity. There will be a large number of acceleration points (30). This would require more computation, but would provide the user maximum flexibility in movement.

Figure 3D:
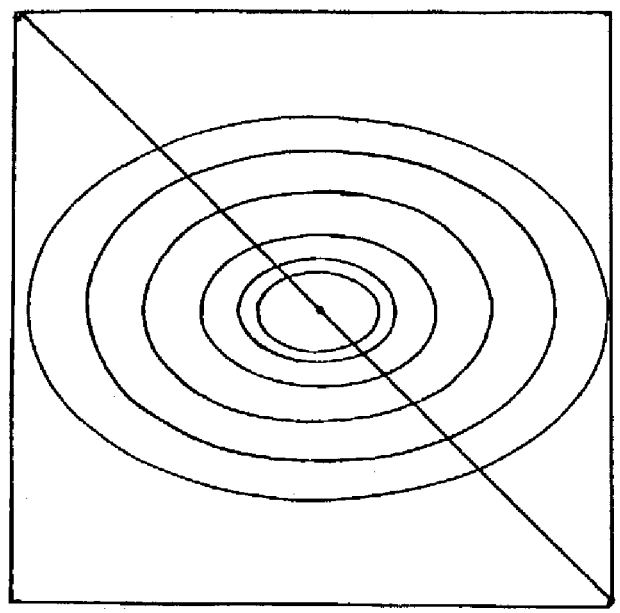
Figure 3E:
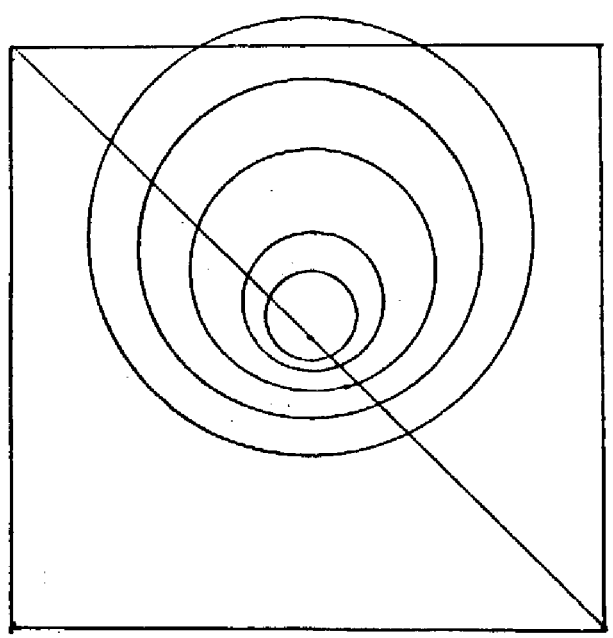

In each of the embodiments described above, distance r is translated to a velocity without regard to the direction of travel. Thus, the velocity zones are circular and concentric about a common centre point. However, in alternative embodiments, the velocity zones may be oval shaped or some other non-circular shape as is illustrated in FIG. 3D. Or the velocity zones may be circular but not concentric, as is shown in FIG. 3E. In these cases, as one skilled in the art will realize, the calculation of velocity from distance r must also factor in a directional component.

With the direction and velocity (or velocity zone (33)) calculated, that information must now be transferred to the display device. The simplest way to transfer this data would be to send both the direction and the velocity. However, this data may contain floating point values and may require the transfer of several bytes of data. In one embodiment, it is preferred to condense both the direction and magnitude such that the data can be put into a single byte; however, some degree of precision is sacrificed.

Figure 4:
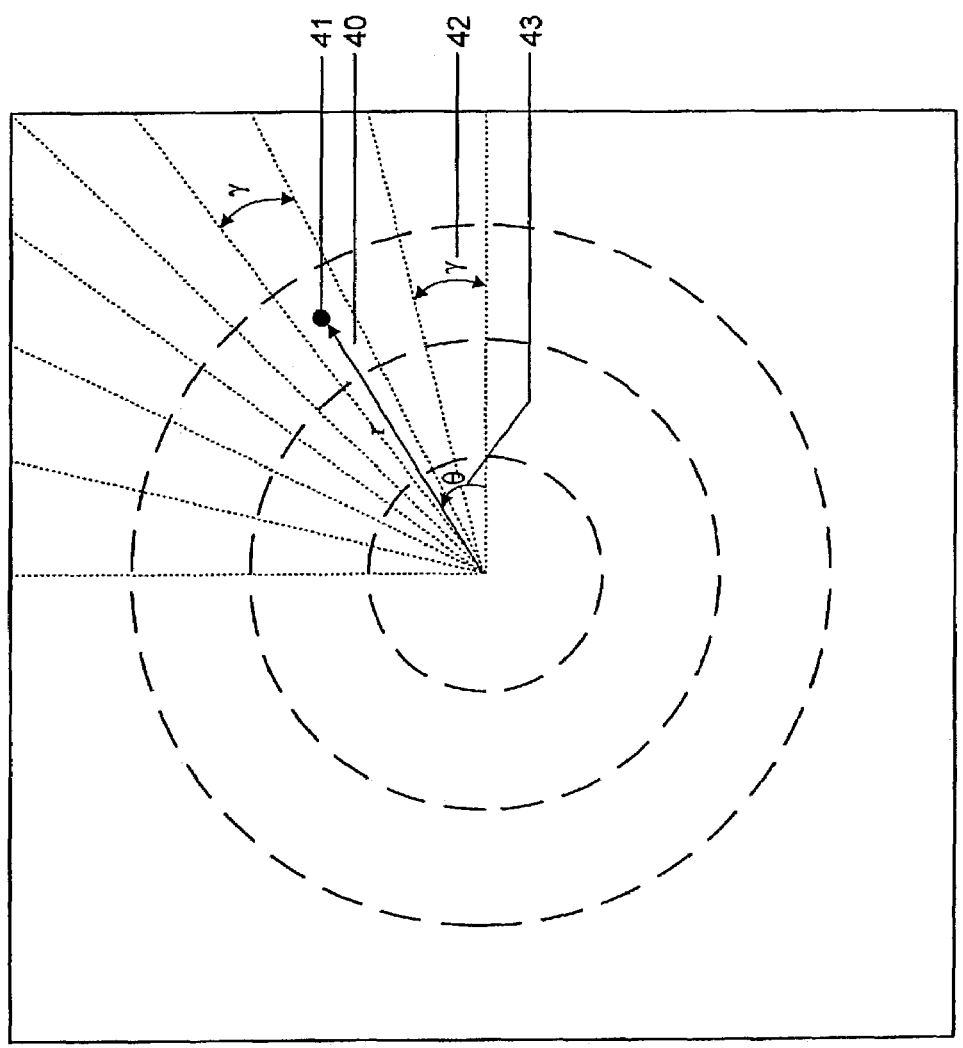
FIG. 4 is a schematic diagram illustrating how to get the normalized direction as well as a velocity zone.
Figure 5:
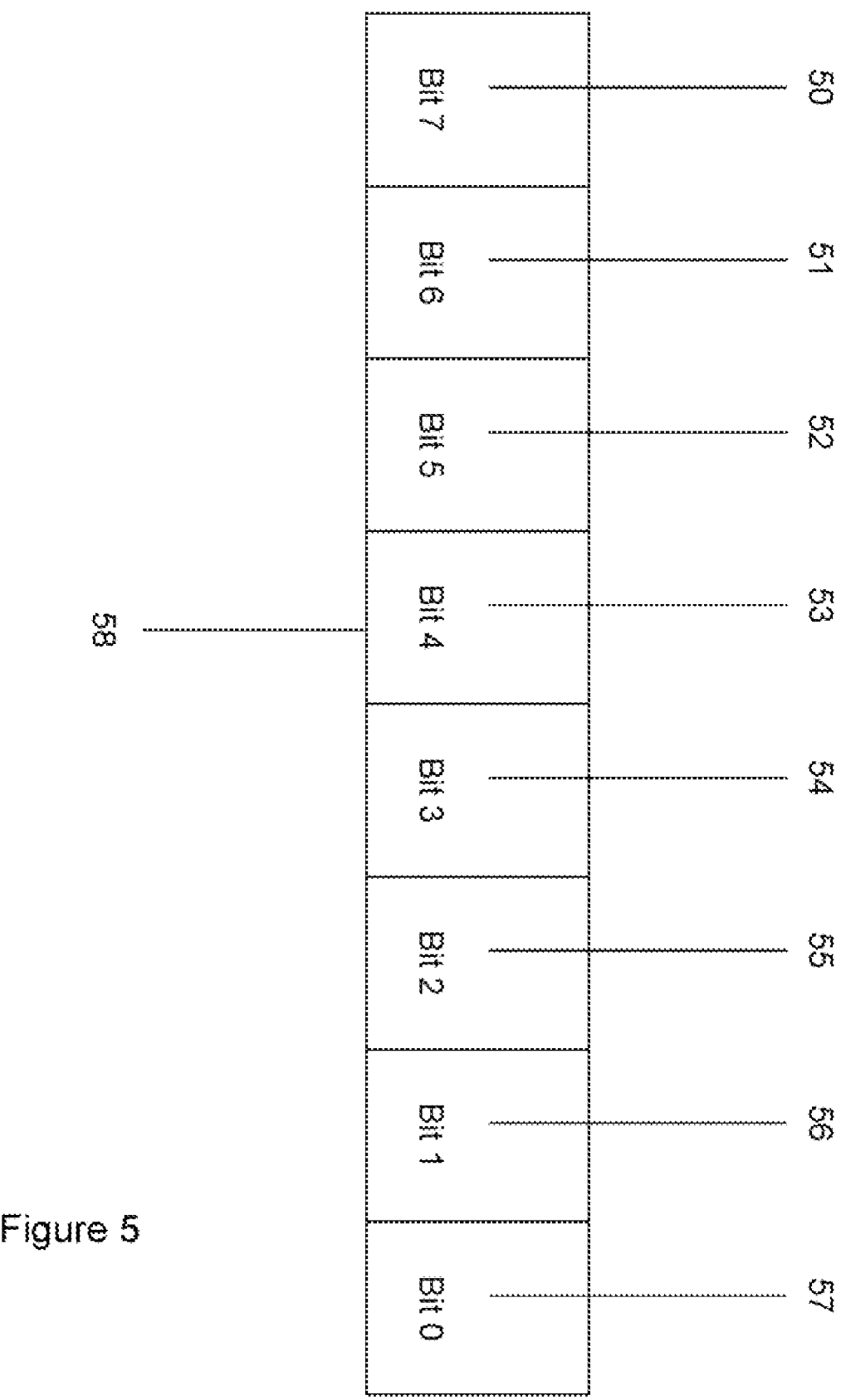
FIG. 5 is a schematic diagram used to illustrate a method of packaging the data into one byte.
Figure 6:
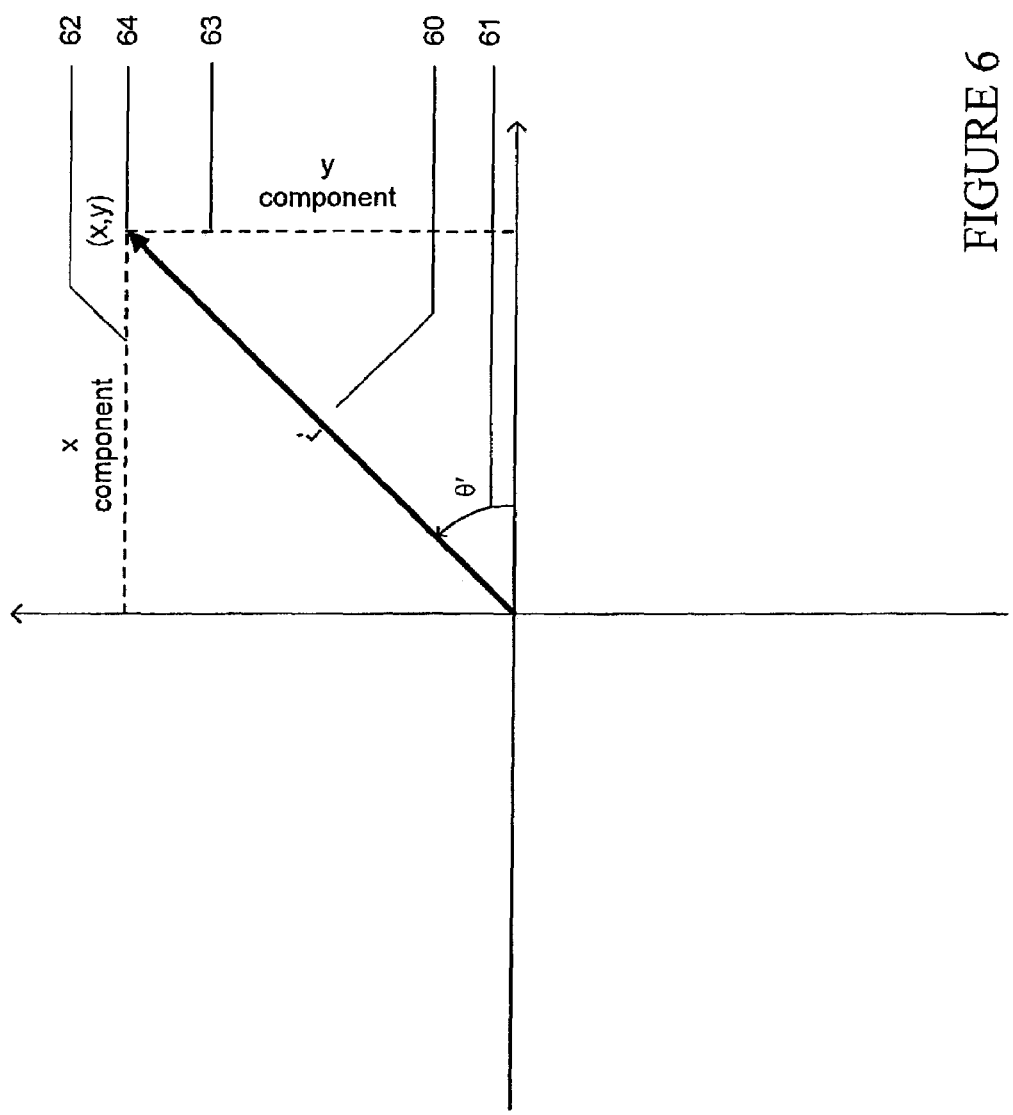
FIG. 6 is a schematic diagram used to illustrate how to recover the x and y components of the velocity vector.

The first accuracy adjustment is to send a normalized angle instead of the exact angle as illustrated in FIG. 4. This will involve a normalization calculation where the calculated angle (43) is normalized by dividing the angle (43) by a predefined sector size Y (42).

$$N = \frac{\text{Angle}(\theta)}{\text{Sector Size }(\gamma)} \quad (6)$$

Where N is the normalized direction, angle Θ (43) is the value calculated above and the sector size Y (42) is the number of degrees per direction sector (40). The sector size Y (42) is calculated by taking 360 degrees and dividing it by the total number of divisions M.

$$\text{Sector Size }(\gamma) = \frac{360}{\text{Number Of Divisions }(M)} \quad (7)$$

Therefore, in the example given in FIG. 4 there are 32 divisions throughout the circle and, thus, the sector size (42) would be 360/32 or 11.25°. Now, if the point (41) had an angle (43) of 25°, then the normalized direction N equals 25/11.25 or 2.22. It therefore would be increased to the next largest whole number and thus the normalized direction would be 3. This results in the point (41) being in the third directional sector (40) and in the third velocity zone (40).

If a large number of velocity zones (33) are used, then the velocity zone may need to be normalized as well. This could be done during the velocity zone calculation or afterwards by dividing the velocity zone by a normalization factor.

Once velocity and direction information is collected, it must be transferred to the display. It is preferable that such information be transferred in a compact form. In one embodiment, all pointer command information, including velocity and direction, may be included in one byte of data.

The first step in transferring the information using a single byte is to make sure that both the vector zone (33) and normalized direction are integer values with no floating-point components. This conversion can be performed by rounding, truncation, or increasing the number to the next largest integer value (this can be performed by truncating the value and adding one). This loss of accuracy will not be noticeable by the user as long as the sector size (42) is optimized for both usability and data transfer which involves using as many divisions as possible without overflowing the space allocated for the data.

Most pointer devices also include one or more buttons and this control information must be transferred as well. Essentially there are three types of button events: up, down, and click. Although a click event can be described as a down event immediately followed by an up event, often it is easier to send a click as a separate event. The click event is determined by a down event and an up event that occurs within a certain time period. Essentially, when a down event occurs, a timer is started. If the up event occurs before the timer expires, then the user intended a click to occur and a click event is passed to the display. If the timer expires, then a down event is sent to the display. When the user releases the button, an up event is sent to the display. In a touch screen device, if the user presses on the touch screen for less than the timer period, it will be recorded as a click event for the more commonly used button (on two button systems this will normally be the left button).

Now that all of the data is ready (direction, magnitude, and button events), that data can now be transferred. As mentioned previously, the data could be sent as several bytes. However, all of the information can be packed into a single byte if the requirements of the data stream are such to require this.

In one embodiment, the pointer control data may be transmitted by:
1) Break up the byte (8 bits) (58) into 3 parts: 1 bit for data type (50), 2 bits for magnitude (51, 52), and 5 bits for direction (53, 54, 55, 56, 57).
2) Clear the data type bit (50) to indicate that a pointer movement is being transferred.
3) Take the normalized magnitude (which may be between 0 and 3, 4 possible values) and place it in the magnitude bits (51, 52).
4) Take the normalized direction (which should be between 0 and 31, 32 possible values) and place it in the direction bits (53, 54, 55, 56, 57).

To transmit a button event:
1) Break up the byte (58) into 2 parts: 1 bit for the data type (50) and the rest of the bits for the pointer button event (51, 52, 53, 54, 55, 56, 57).
2) Set the data type bit (50) to indicate that a pointer button event is being transferred.
3) Set the button mask (bits 0-6) (51, 52, 53, 54, 55, 56, 57) to indicate the button and event. A possible mask is to have bit 3 and 4 (53, 54) set to the button and bits 0 to 2 (51, 52, 53) set to the type of event.

The above allows for the transfer of any pointer movement or button event as a single byte; however, the cost of doing this is that, since the number of sectors (40) and the number of velocity zones (33) is minimal, the resulting pointer (9) movements may be awkward. The transmission of a stop movement, or "stop everything" command, could be to set the data type bit (50) and clear all the other bits.

When movement data is received, it is broken down into a magnitude (60) and an angle (61). Recovery of the angle (61) and magnitude (60) from the sent data can take several forms—which can differ for bandwidth and performance reasons.

To recover pointer movement data, which was encoded with the bit-wise method described above, the type of data must first be determined. This is done by testing the top-most significant bit (50) and, if it is cleared, then the data indicates a movement; if it is set, then the data represents a button event. The velocity zone (33,60) can be recovered by masking the byte (58) with 01100000, or in hexadecimal, 0×60, and bit shifting the resultant value to the right five times. To recover the normalized direction (61), the byte (58) must be masked with 00011111, or in hexadecimal, 0×1F, multiplying this value by the sector size (42) to recover the normalized direction. These two values can then be used to facilitate a pointer movement using the method outlined below.

The computer code in ANSI C that would allow the recovery of a normalized angle (direction) 112.5° and velocity zone (33,60) 3 from a byte with the binary value 01101010 is:

input_byte=0b01101010;

sector_size=11.25;

direction=(input_byte & 0x1F)*sector_size;

velocity_zone=(input_byte & 0x60)>>5;

If the received byte (58) is a pointer button event, i.e. the data type bit (50) is set, then the button and event data can be recovered using the same masking technique as shown for the recovery of pointer movements. When pointer button events are received, they are immediately sent to the operating system as such, through standard interface calls. Similarly, a stop command would be immediately sent to the operating system.

An alternate method of encoding the data, that can improve the resolution of the direction and can include more velocity zones (33) than the bit-wise method, while still using only a single data byte, is outlined below.

The velocity zone (33) and number of directional divisions (M) should be selected so that the product of the velocity zone (33) and number of divisions (M) is less than 255 (for one byte) with enough values left to accommodate pointer button events. To prevent the need for another byte for transferring point button event data, there should be a sufficient number of values left in the byte to represent all possible pointer button events. Equation 8 illustrates the calculation of this value.

$$\text{Value} = N + (M \times \text{Velocity Zone}) \tag{8}$$

To encode any pointer button events, a maximum value for the velocity zone (33) is set so that enough values in the byte are available to accommodate all of the pointer button events. Pointer button events are then assigned values in the remaining integers. The same would be true for the stop movement event.

To differentiate between pointer button events and pointer movement data, a maximum value is checked. If the value is higher than that maximum, the data indicates that a pointer button event is to be recovered and each number above the maximum would then indicate a certain button event. If the value is lower than that maximum, pointer movement data is recovered. Since the encoded value contains a multiple of the number of divisions (M), dividing the encoded value by the number of divisions (M) and truncating this result will give the velocity zone (33,60) (Equation 9). The normalized direction (N) is calculated by subtracting the number of divisions (M) times the velocity zone (33,60) from the encoded value (Equation 10). The normalized angle (61) is calculated by taking this result and multiplying it by the sector size (y) (Equation 11).

$$\text{Velocity Zone} = \text{Trunc}\left(\frac{\text{Value}}{M}\right) \tag{9}$$

$$N = \text{Value} - (M \times \text{Velocity Zone}) \tag{10}$$

$$\text{Normalized Angle} = N \times y \tag{11}$$

The above methods of packaging data are only two possible methods. Other methods are possible and are included within the scope of the present invention.

After recovering the velocity zone (33,60) and normalized angle (61), the velocity vector (64) can be calculated. This velocity vector (64) can be used to calculate the horizontal (62) and vertical (63) change from the current pointer position. The horizontal component, or x component (62), is found using Equation 12. The vertical component, or y component (63), is found using Equation 13. These components can then be multiplied by scaling factors, which will provide additional velocity to the pointer movements. Different scaling factors for different velocity zones can provide for varying acceleration and adjustments for display resolutions.

$$X_{component} = \text{scale factor} \times \text{velocity zone} \times \cos(\text{Normalized Angle}) \tag{12}$$

$$Y_{component} = (-1) \times \text{scale factor} \times \text{velocity zone} \times \sin(\text{Normalized Angle}) \tag{13}$$

It is often necessary to invert the sign of the y component (63), because the top left corner of most displays are set to zero coordinates and all of the values right and down from there are positive values. Therefore, the y values increase down the screen.

A vector that indicates a movement up will have a positive y component and if this were added to the current y position, then the net movement would be towards the bottom of the screen opposite to that desired. To compensate for this, often a multiplying factor of −1 is used to adjust the y component.

Figure 7:
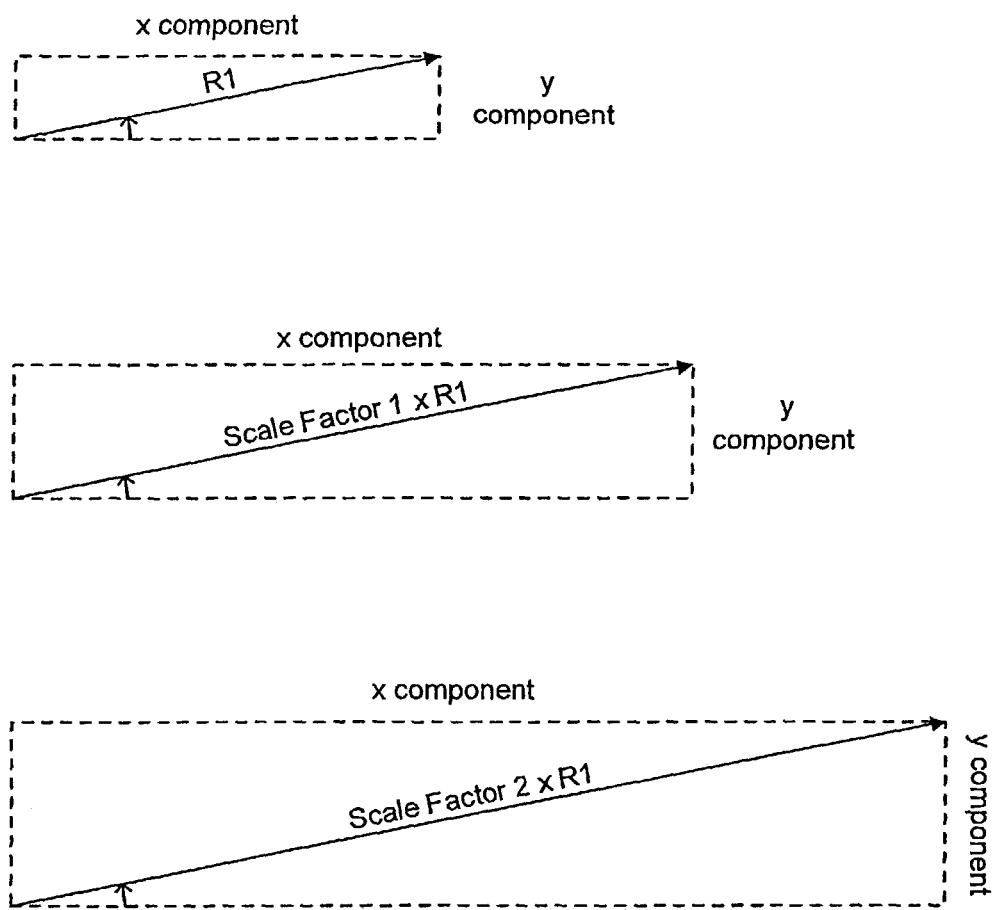
FIG. 7 is a schematic diagram illustrating how scaling factors affect velocity vectors.

Different velocity zones (33,60) can be scaled for each movement of the mouse pointer. At each threshold state, a different scaling factor can by multiplied to the velocity zone (33) to achieve a different net effect allowing control of the pointer movement on the display device at different rates. For example, on a CRT monitor, the factor multiplied to the velocity zone could be increased, as the resolution displayed on the monitor is increased, to give relational movement to the size of the screen. An example of how a single velocity vector can be scaled is shown in FIG. 7.

The velocity zone (33,60) can be used to create a delay factor for sending inputs to the operating system. A delay factor is necessary for regulating pointer movement at a pace where the user has a reasonable time to react and to control the pointer. The final delay factor can be found by dividing a maximum delay value by the current velocity zone. The maximum delay value is arbitrary, but should be large enough so that the slowest pointer movement is precise. By reducing the delay value, movements will occur more frequently and thus speed of movement is also increased. Alternate methods for delaying movement can also be used.

Figure 8:
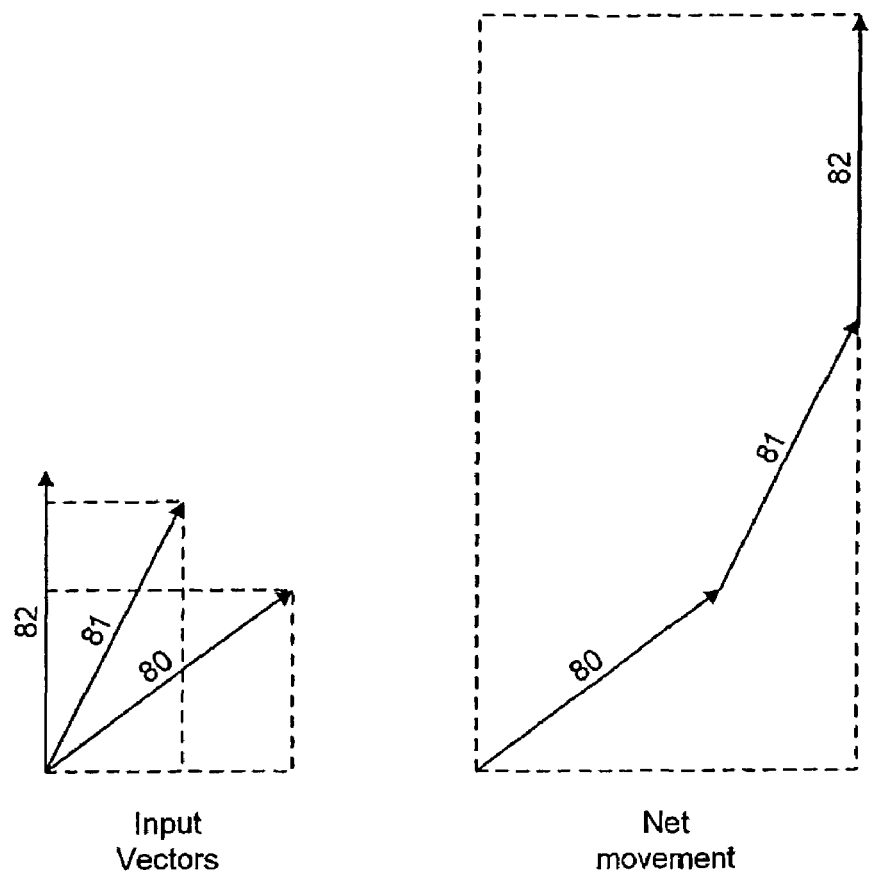
FIG. 8 is a schematic diagram illustrating how movements are calculated on the receiving display device.
Figure 9:
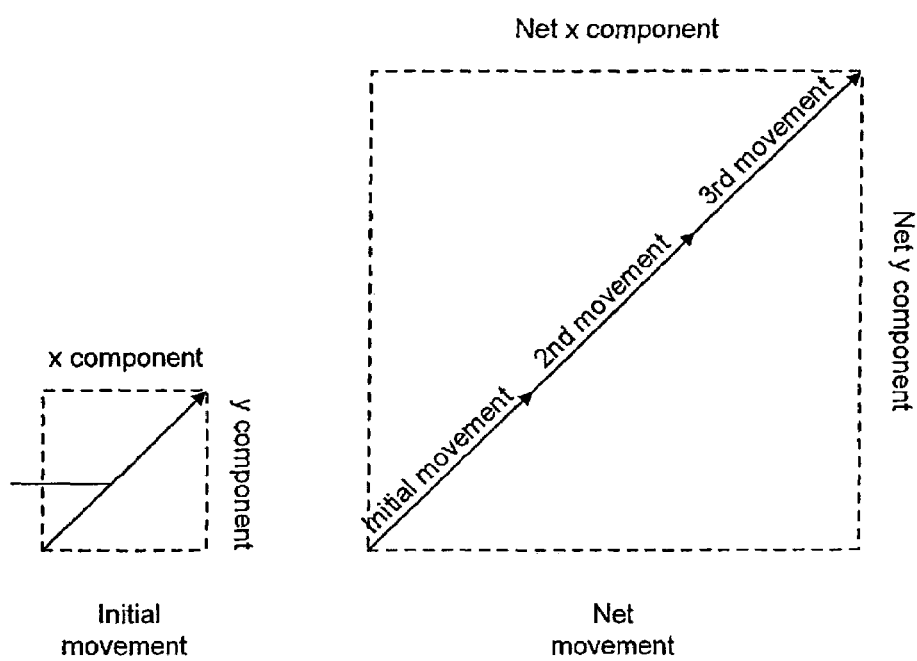
FIG. 9 is a schematic diagram illustrating how if a single velocity vector is received, but no stop command is issued, the pointer continues to move at that speed, direction, and velocity zone.

When several velocity vectors (80, 81, 82) are received in succession, the net effect is vector addition of the vectors. Each movement is sent to and interpreted by the operating system, a delay is initiated, and the next vector is added. The pointer movement appears much more fluid in this manner and movement appears predictable to the user. An example of this behavior can been seen in FIG. 8. If a single velocity vector (90) is received, but no stop command is issued, the pointer continues to move at the initial speed, direction, and velocity zone, as demonstrated in FIG. 9.

Movement is performed using a worker thread on a multi-threaded operating system. The movement thread sends an API (Application Programming Interface) call to the operating system, which tells it to move the pointer x pixels/twips horizontally and y pixels/twips vertically. The thread then pauses for a time period specified by the delay value and repeats until the thread is to be terminated. Each pointer movement is initiated from the end of the last pointer movement. An initial, non-terminated, velocity vector (64) is recovered and over three loops of the movement thread results in the second net movement.

When movement is initiated on the target device, a worker thread is created on the target device to send successive inputs to the operating system using API calls. These API calls can be interpreted as direct input to the operating system for pointer input. If pointer movement data is received, and a worker thread is already sending pointer movement instructions to the operating system, the velocity zone (33, 60), direction (61), and delay are changed, but the thread is left running. Once a stop movement command is received, the velocity vector (64) is set to zero and the worker thread is terminated.

In the absence of a multithreading system, any new velocity vectors (64) would need to be interpreted, and both the x, y and delay values would have to be set before resuming movement of the pointer. The main function loop could have an infinite loop checking for new velocity vector data, as well as moving the pointer when necessary.

It will be readily seen by those skilled in the art that various modifications of the present invention may be devised without departing from the essential concept of the invention, and all such modifications and adaptations are expressly intended to be included in the scope of the claims appended hereto.

The invention claimed is:

1. A method of providing user input to a computing system having a display device, said computing system adapted to generate a computer click event in response to a click event signal, said computing system further adapted to move a screen pointer on said display device in response to a screen pointer control signal, the method comprising the steps of:
   a) providing a touch screen comprising a contact-sensitive sensor area having x-y coordinates;
   b) establishing an initial centre point by applying and maintaining contact on said sensor area;
   c) determining the x-y coordinates of said centre point;
   d) establishing a plurality of directional zones disposed about said centre point on said sensor area, each directional zone converging on said centre point;
   e) establishing a plurality of annular velocity zones extending circumferentially about said centre point on said sensor area, the intersection of said velocity zones and said directional zones thereby defining a plurality of sectors, each sector defining a predetermined direction component and a predetermined velocity component for a screen pointer control signal;
   f) generating a click event signal if said contact is removed from said sensor area within a predetermined period of time, said predetermined period of time commencing when said contact is initially applied to said sensor area at said centre point;
   g) generating a first screen pointer control signal if said contact on said sensor area is maintained for a period of time greater- than said predetermined period of time, said generation of said first screen pointer control signal comprising the steps of:
      i) moving said contact on said sensor area from said centre point to a first point on said sensor area,
      ii) determining the x-y coordinates of said first point,
      iii) deriving a first distance 'r' and a first angle 'θ' of a first straight-line vector extending from the x-y coordinates of said centre point to the x-y coordinates of said first point,
      iv) correlating said first distance 'r' to a first velocity zone and correlating said first angle 'θ' to a first directional zone to thereby derive the sector said first point is located in,
      v) deriving the direction and velocity components for the sector said first point is located in,
      vi) processing said derived direction and velocity components for inclusion in said first screen pointer control signal, and
      vii) generating said first screen pointer control signal comprising said processed direction and velocity components; and
   h) transmitting said click event signal or said first screen pointer control signal to said computing system.

2. The method as set forth in claim 1 further comprising the step of transmitting a screen pointer stop command to said computing system if said contact is removed from said sensor area after said first screen pointer control signal has been transmitted, said computing system further adapted to stop movement of said screen pointer in response to said screen pointer stop command.

3. The method as set forth in claim 1 further comprising the steps of:
   a) generating a second screen pointer control signal after said first screen pointer control signal has been transmitted to said computing system if said contact is maintained on said sensor area, said generation of second screen pointer control signal comprising the steps of:
      i) moving said contact on said sensor area from said first point to a second point on said sensor area,
      ii) determining the x-y coordinates of said second point,
      iii) deriving a second distance 'r' and a second angle 'θ' of a second straight-line vector extending from the x-y coordinates of said centre point to the x-y coordinates of said second point,
      iv) correlating said second distance 'r' to a second velocity zone and correlating said second angle 'θ' to a second directional zone to thereby derive the sector said second point is located in,
      v) determining whether said second point is located in the seine sector as the first point, and
      vi) if said second point is not located in the same sector as said first point, deriving the direction and velocity components for the sector said second point is located in, processing said derived direction and velocity components for inclusion in said second screen pointer control signal, and generating said second screen pointer control signal comprising said processed direction and velocity components; and
   b) transmitting said second screen pointer control signal to said computing system if said second point is not located hi the same sector as said first point, said computing system further adapted to move said screen pointer on said display device in a direction and at a velocity in accordance with the direction component and the velocity component of said second screen pointer control signal.

4. The method as set forth in claim 3 wherein steps a) and b) are repeated for each subsequent movement of said contact on said sensor area provided that said contact is maintained on said sensor area.

5. The method as set forth in claim 3 further comprising the step of transmitting a screen pointer stop command to said computing system if said contact is removed from said sensor area, said computing system further adapted to stop movement of said screen pointer in response to said screen pointer stop command.

6. The method as set forth in claim 2 wherein any one of said click event signal, said screen pointer control signals and said screen pointer stop command is transmitted wirelessly to said computing system.

7. The method as set forth in claim 1 wherein said directional zones are wedge-shaped as they converge upon said centre point.

8. The method as set forth in claim 1 wherein each of said velocity zones represents a different velocity component.

9. The method as set forth in claim 8 wherein said velocity components change in magnitude linearly in each successive velocity zone from said centre point.

10. The method as set forth in claim 9 wherein said velocity components increase in magnitude linearly in each successive velocity zone from said centre point.

11. The method as set forth in claim 8 wherein said velocity components change non-linearly in magnitude in each successive velocity zone from said centre point.

12. The method as set forth in claim 11 wherein said velocity components increase non-linearly in magnitude in each successive velocity zone from said centre point.

13. The method as set forth in claim 1 wherein said velocity zones arc circular.

14. The method as set forth in claim 1 wherein said velocity zones are non-circular.

15. The method as set forth in claim 1 further comprising the step of initiating a timer upon establishing said centre point, said timer adapted to count down said predetermined period of time.

16. The method as set forth in claim 4 further comprising the step of transmitting a screen pointer stop command to said computing system if said contact is removed from said sensor area, said computing& system further adapted to stop movement of said screen pointer in response to said screen pointer stop command.

17. A system for providing user input to a computing system having a display device, said computing system adapted to generate a computer click event in response to a click event signal, said computing system further adapted to move a screen pointer on said display device in response to a screen pointer control signal, comprising:
   a) a touch screen comprising a contact-sensitive sensor area having x-y coordinates;
   b) a finger or a stylus for establishing an initial centre point by applying and maintaining contact on said sensor area;
   c) means for determining the x-y coordinates of said centre point;
   d) means for establishing a plurality of directional zones disposed about said centre point each directional zone converging on said centre point;
   e) means for establishing a plurality of annular velocity zones extending circumferentially around said centre point, the intersection of the velocity zones and the directional zones thereby defining a plurality of sectors;
   f) means for defining a predetermined direction component and a predetermined velocity component for each sector, said direction and velocity components adapted for inclusion in a screen pointer control signal;
   g) means for generating a click event signal if said contact is removed from said sensor area within a predetermined period of time, said predetermined period of time commencing when said centre point is established;
   h) means for generating a first screen pointer control signal if said contact is maintained on said sensor area for a period of time greater than said predetermined period of time and is moved from said centre point to a first point on said sensor area, said means for generating said first screen pointer control signal comprising:
      i) means for determining the x-y coordinates of said first point,
      ii) means for deriving a first distance 'r' and a first angle '$\theta$' of a first straight-line vector extending from the x-y coordinates of said centre point to the x-y coordinates of said first point,
      iii) means for correlating said first distance 'r' to a first velocity zone and correlating said first angle '$\theta$' to a first directional zone to thereby derive the sector the first point is located in,
      iv) means for deriving the direction and velocity components for the sector the first point is located in,
      v) means for processing said derived direction and velocity components for inclusion in said first screen pointer control signal, and
      vi) means for generating said first screen pointer control signal comprising said processed direction and velocity components; and
   i) means for transmitting said click event signal or said first screen pointer control signal to said computing system.

18. The system as set forth in claim 17 further comprising means for transmitting a screen pointer stop command to said computing system if said contact is removed from said sensor area after said first screen pointer control signal has been transmitted, said computing system further adapted to stop movement of said screen pointer in response to said screen pointer stop command.

19. The system as set forth in claim 17 further comprising:
   a) means for generating a second screen pointer control signal after said first screen pointer control signal has been transmitted to said computing system if said contact is maintained on said sensor area and is moved from said first point to a second point on said sensor area, said means for generating said second screen pointer control signal comprising:
      i) means for determining the x-y coordinates of said second point,
      ii) means for deriving a second distance 'r' and a second angle '$\theta$' of a second straight-line vector extending from the x-y coordinates of said centre point to the x-y coordinates of said second point,
      iii) means for correlating said second distance 'r' to a second velocity zone and correlating said second angle '$\theta$' to a second directional zone to thereby derive the sector the second point is located in,
      iv) means for determining whether said second point is located in the same sector as said first point,.
      v) means for deriving the direction and velocity components for the sector said second point is located in, vi) means for processing said derived direction and velocity components for inclusion in said second screen painter control signal, and vii) means for generating said second screen pointer control signal comprising said processed direction and velocity components; and b) means for transmitting said second screen pointer control signal to said computing system, said computing system Thither adapted to move said screen pointer on said display device in a direction and at a velocity in accordance with the direction component and the velocity component of said second screen pointer control signal.

20. The system as set forth in claim 19 wherein said system is further adapted not to transmit said second screen pointer control signal to said computing system if said second point is located in the same sector as said first point.

21. The system as set forth in claim 19 further comprising means for transmitting a screen pointer stop command to said computing system if said contact is removed from said sensor area, said computing system further adapted to stop movement of said screen pointer in response to said screen pointer stop command.

22. The system as set forth in claim 18 further comprising means for wirelessly transmitting any one of said click event signal, said screen pointer control signals and said screen pointer stop command to said computing system.

23. The system as set forth in claim 17 wherein said directional zones are wedge-shaped as they converge upon said centre point.

24. The system as set forth in claim 17 wherein each of said velocity zones represents a different velocity component.

25. The system as set forth in claim 24 wherein said velocity components change linearly in magnitude in each successive velocity zone from said centre point.

26. The system as set forth in claim 25 wherein said velocity components increase linearly in magnitude in each successive velocity zone from said centre point.

27. The system as set forth in claim 24 wherein said velocity components change non-linearly in magnitude in each successive velocity zone from said centre point.

28. The system as set forth in claim 27 wherein said velocity components increase non-linearly in magnitude in each successive velocity zone from said centre point.

29. The system as set forth in claim 17 wherein said velocity zones are circular.

30. The system as set forth in claim 17 wherein said velocity zones are non-circular.

31. The system as set forth in claim 17 further comprising a timer adapted to count down said predetermined period of time.

32. The system as set forth in claim 21 further comprising means for wirelessly transmitting any one of said click event signal, said screen pointer control signals and said screen pointer stop command to said computing system.

* * * * *